(12) United States Patent
Deveze et al.

(10) Patent No.: US 8,694,161 B2
(45) Date of Patent: Apr. 8, 2014

(54) COLLABORATIVE AUTOMATED MOBILE PLATFORM

(75) Inventors: Thierry Deveze, Louveciennes (FR); Joël Morillon, Magny Les Hameaux (FR); Laurent Vasseur, Sannois (FR)

(73) Assignee: Thales, Neuilly Sur Seine (FR)

( * ) Notice: Subject to any disclaimer, the term of this patent is extended or adjusted under 35 U.S.C. 154(b) by 0 days.

(21) Appl. No.: 13/996,536

(22) PCT Filed: Dec. 20, 2011

(86) PCT No.: PCT/EP2011/073408
§ 371 (c)(1),
(2), (4) Date: Oct. 30, 2013

(87) PCT Pub. No.: WO2012/084947
PCT Pub. Date: Jun. 28, 2012

(65) Prior Publication Data
US 2014/0046507 A1   Feb. 13, 2014

(30) Foreign Application Priority Data
Dec. 23, 2010   (FR) ..................... 10 05083

(51) Int. Cl.
*G05B 19/04* (2006.01)
*B62D 51/00* (2006.01)
*B62D 51/02* (2006.01)
*B60K 26/02* (2006.01)
*G05D 1/12* (2006.01)

(52) U.S. Cl.
CPC ............. *B62D 51/00* (2013.01); *B62D 51/02* (2013.01); *B60K 26/02* (2013.01); *G05D 1/12* (2013.01)

USPC ........... 700/253; 700/22; 700/254; 700/258; 318/568.1; 414/411; 416/43; 156/750; 221/25; 73/863; 180/8.1; 180/8.3; 180/14.2; 180/65.1; 180/65.51

(58) Field of Classification Search
CPC ....... B62D 51/00; B62D 51/02; B60K 26/02; G05D 1/12
USPC ............. 700/22, 253, 254, 258; 180/8.1, 8.3, 180/14.2, 65.1, 65.51; 318/568.1; 414/411; 416/43; 156/750; 221/25; 73/863
See application file for complete search history.

(56) References Cited

U.S. PATENT DOCUMENTS

| 4,909,341 | A | 3/1990 | Rippingale et al. |
| 4,951,768 | A | 8/1990 | Littmann et al. |
| 6,866,107 | B2 * | 3/2005 | Heinzmann et al. ........... 180/7.1 |

(Continued)

FOREIGN PATENT DOCUMENTS

| EP | 0305299 A1 | 3/1989 |
| FR | 2162829 | 7/1973 |

(Continued)

*Primary Examiner* — McDieunel Marc
(74) *Attorney, Agent, or Firm* — Baker and Hostetler LLP

(57) ABSTRACT

A collaborative robotized system comprises: a mobile platform furnished with running device, with an electric motor propulsion assembly, and with a longitudinal mechanical linkage assembly comprising an articulation; an electrical power source; manual control device of the system; remote control device of the system; a computer assembly of at least one computer; hardware-incorporating device suitable for integrating sensors and effectors, and software-incorporating device suitable for integrating software elements; and management device for managing integrated sensorimotor behaviors, suitable for arbitrating implementations of several sensorimotor behaviors in parallel.

13 Claims, 2 Drawing Sheets

(56) References Cited

U.S. PATENT DOCUMENTS

| | | | |
|---|---|---|---|
| 7,004,271 B1 * | 2/2006 | Kamen et al. | 180/21 |
| 7,546,889 B2 * | 6/2009 | Kamen et al. | 180/7.1 |
| 7,690,447 B2 * | 4/2010 | Kamen et al. | 180/21 |
| 7,900,725 B2 * | 3/2011 | Heinzmann et al. | 180/65.1 |
| 8,453,768 B2 * | 6/2013 | Kamen et al. | 180/7.1 |
| 8,467,941 B2 * | 6/2013 | Field et al. | 701/49 |
| 8,522,902 B2 * | 9/2013 | Gomi et al. | 180/21 |
| 2002/0062999 A1 | 5/2002 | DeNoor et al. | |
| 2007/0132204 A1 | 6/2007 | Sewell | |
| 2009/0301804 A1 * | 12/2009 | Saito et al. | 180/444 |
| 2011/0071728 A1 * | 3/2011 | Andoh | 701/37 |
| 2012/0303160 A1 * | 11/2012 | Ziegler et al. | 700/259 |

FOREIGN PATENT DOCUMENTS

| | | |
|---|---|---|
| FR | 2652313 A1 | 3/1991 |
| GB | 1366587 | 9/1974 |
| WO | 2007/057904 A1 | 5/2007 |
| WO | 2008/060689 A1 | 5/2008 |

* cited by examiner

COLLABORATIVE AUTOMATED MOBILE PLATFORM

CROSS-REFERENCE TO RELATED APPLICATIONS

This application is a National Stage of International patent application PCT/EP2011/073408, filed on Dec. 20, 2011, which claims priority to foreign French patent application No. FR 1005083, filed on Dec. 23, 2010, the disclosures of which are incorporated by reference in their entirety.

FIELD OF THE INVENTION

The present invention pertains to a collaborative robotized system, i.e. a robotized system that is able to aid a human being in difficult or hostile surroundings, particularly a user moving on foot.

BACKGROUND

Remotely controlled robots are known, for example, for aiding mine-clearance. For example the mine-clearing robot SCAMP for "Specialized Compact Automated Mechanical-clearance Platform", is a compact mechanical platform making it possible to secure a zone comprising mines. Such a robot comprises a traveling cage containing six pistons which exert pressures on the ground, by means of metallic casters. The pressure exerted on the ground is designed to detonate any mine buried at the location where this pressure is exerted. The robot is designed to withstand the blast of an anti-personnel mine.

Another known example is the radiocontrolled HD2 SWAT Tactical mine-clearance robot, also capable of climbing stairs by virtue of the use of wheels furnished with teeth and a rubber tread.

Such robots are not multipurpose, and cannot provide extensive assistance to a user operating in hostile surroundings.

SUMMARY OF THE INVENTION

An aim of the invention is to propose an adaptable, modifiable, collaborative robotized system of reduced bulk, that is also able to transport its user.

According to one aspect of the invention, there is proposed a collaborative robotized system comprising:
a mobile platform furnished with running means, with an electric motor propulsion assembly, and with a longitudinal mechanical linkage assembly comprising an articulation;
an electrical power source;
manual means of control of the system;
means of remote control of the system;
a computer assembly of at least one computer;
hardware-incorporating means suitable for integrating sensors and effectors, and software-incorporating means suitable for integrating software elements; and
management means for managing integrated sensorimotor behaviors, suitable for arbitrating implementations of several sensorimotor behaviors in parallel on the basis of a priori knowledge about the performance of said sensorimotor behaviors (CS) as a function of the environment of the mobile platform (PFM), and suitable for operating with adjustable autonomy varying from complete autonomy to teleoperation, via partial autonomy of collaboration with a teleoperator, for the various sensorimotor behaviors (CS).

A sensorimotor behavior is a displacement capability based on information relating to the environment near the vehicle ("attain a perceived object", "follow a road", etc.); this capability consists of a slaving loop receiving as input a directive as well as the data arising from diverse onboard environmental sensors, and generating as output the control necessary for the various motors acting on the displacement of the system. The system, notably in autonomous mode, is thus capable of managing or arbitrating the sensorimotor behaviors to be implemented so as to perform a mission requested by the user.

Such a robotized system makes it possible to have a collaborative robotized system having a manual/remotely controlled/autonomous reversible control mode, of reduced bulk, capable of avoiding or of negotiating obstacles. Furthermore, the collaborative robotized system is modifiable, and adaptable, according to the applications envisaged.

Furthermore, said management means (GES) for managing integrated sensorimotor behaviors (CS), can be adapted to arbitrate implementations of several sensorimotor behaviors (CS) in parallel, furthermore on the basis of a priori knowledge of performance of the algorithm implemented by a sensorimotor behavior (CS), and of a confidence index regarding the ability of the algorithm to correctly accomplish the sensorimotor behavior (CS).

For example, said computer assembly has parallel processors comprising elementary processors able simultaneously to execute one and the same instruction on different data belonging to a data structure.

The use of such computers, for example described in French patent application FR 2162829, makes it possible to have great power, with low consumption of energy and great compactness.

According to one embodiment, said articulation is furnished with an electric motor controlled by means for managing the stability of the platform which are furnished with means for measuring the inclination of the running surface.

Thus the articulation is an active articulation, allowing controlled maintaining of the equilibrium of the mobile platform, notably while the mobile platform advances over a rugged terrain or else while negotiating an obstacle.

The articulation can be, for example, a pivot with longitudinal axis, when referring to said mobile platform.

The presence of such a pivot link makes it possible to improve at any instant the contact between each of the four wheels and the running surface, thus guaranteeing the necessary adhesion required for good control of the displacement, as well as the stability of the assembly by maintaining the center of gravity of the robotized system at as low a level as possible.

In one embodiment, the system comprises a millimetric radar, a laser telemeter, and fusion means for merging the data delivered by said radar and said telemeter.

Thus, the collaborative robotized system is capable of detecting or perceiving an extensive range of obstacles liable to be situated on its trajectory, in order to be able to analyze the shape, or indeed the nature thereof, in order to avoid them or negotiate them.

According to one embodiment, said remote control means comprise a wireless communication tactile element, and/or a head-up sight, and/or a control handle.

Thus, the user can easily control the collaborative robotized system remotely, or in manual, readily. In the case of presence of a head-up sight, the user can keep at least one hand available, to perform something other than the control of the robotized system, for example hold a tool.

In one embodiment, said remote control means comprise a force-feedback element.

The force feedback can be generated artificially on the basis of quantities such as the proximity of an obstacle (the effort felt in the control means then being inversely proportional to the distance between the mobile platform and the obstacle or between an element integrated into the mobile platform and the obstacle or element to be reached) or else on the basis of the torque of the traction motors (the effort felt then being proportional to the difficulty of progress of the mobile platform).

In the case of remote manipulation by way of a gripping device belonging to the collaborative robotized system, the user can also, by virtue of the force feedback, effectively manage the gripping device, and correctly manipulate the grasped element.

According to one embodiment, said platform is furnished with means for transmitting information representative of the exterior environment of the platform, and said remote control means comprise means for viewing the exterior environment of the platform.

Thus, notably in the case of a video transmission of the exterior environment of the platform, the user, remotely, can evaluate this environment, and notably the presence of risks or otherwise in this exterior environment of the platform.

In one embodiment, one of the sensorimotor behaviors of the system comprises means for selecting an element to be reached by the mobile platform on the basis of said means for viewing the exterior environment of the platform.

Thus, the user can, remotely, on the basis of the video transmitted, fix an objective to be reached for the collaborative robotized system, which will do it in an autonomous manner. These means are particularly suitable for the achieving of sensorimotor behaviors, such as the automatic homing in on an object, consisting in fixing an objective to be reached for the robotized system, which, in an autonomous manner, will attain it.

In one embodiment, the collaborative robotized system is of reduced bulk, of width less than 70 cm and of mass less than 100 kg.

The reduced dimensions of the collaborative robotized system allow it to follow all types of path that can be followed by a pedestrian.

In one embodiment, said mobile platform is suitable for transporting a human being.

It is designed so as to be able to transport more than 150 kg, for a mass of the system of the order of 100 kg.

According to one embodiment, said mechanical linkage assembly is dismantlable.

For example, it can be mounted using clips, in less than three minutes, making it possible to link, with the mechanical linkage assembly, two elements of the platform each comprising an axle and two wheels.

BRIEF DESCRIPTION OF THE DRAWINGS

The invention will be better understood on studying a few embodiments described by way of wholly non-limiting examples and illustrated by the appended drawings in which.

DETAILED DESCRIPTION

In all the figures, the elements having the same references are similar.

Figure 1:
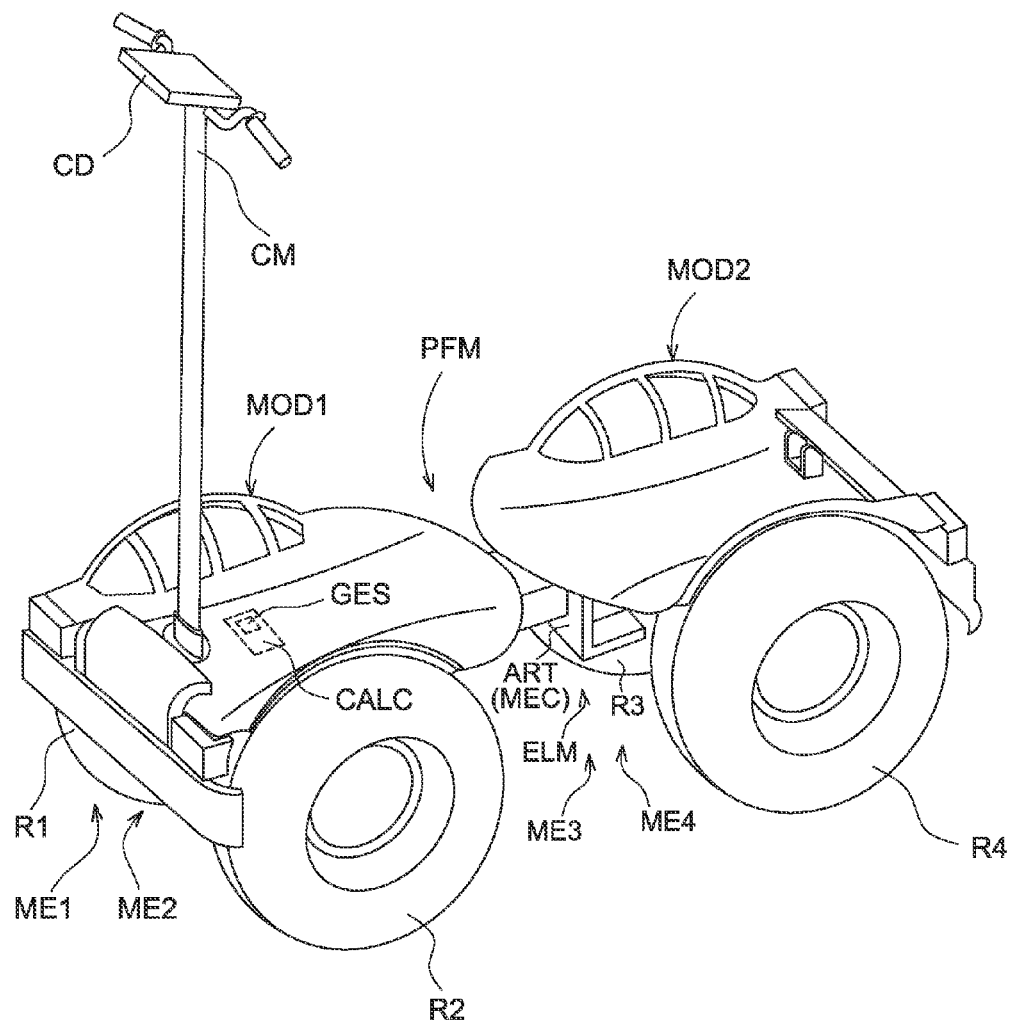
FIG. 1 schematically illustrates a collaborative robotized system, according to one aspect of the invention.

Such as illustrated in FIG. 1, a collaborative robotized system is represented, comprising a mobile platform PFM furnished with a running assembly, in this instance 4 wheels R1, R2, R3 and R4, with an electric motor propulsion assembly, in this instance four electric motors ME1, ME2, ME3, and ME4 respectively associated with the four wheels R1, R2, R3, and R4 of the mobile platform PFM comprising two displacement modules MOD1 and MOD2. The mobile platform PFM also comprises a mechanical linkage assembly ELM furnished with an articulation ART. An electrical power supply source, not represented in the figure, electrically energizes the electric motors of the system. The electrical energy source can be an assembly of electric batteries and/or a fuel cell.

The collaborative robotized system comprises elements for manual control CM, in this instance in the form of handlebars similar to that of a motorbike. The collaborative robotized system also comprises remote control elements, in this instance a wireless communication tactile element CD, represented mounted on the elements for manual control, but being instantaneously dismantlable.

The robotized system also comprises at least one computer CALC, for example having parallel processors, comprising elementary processors able simultaneously to execute one and the same instruction on different data belonging to a data structure. The use of such computers, for example described in French patent application FR 2162829, makes it possible to have a great power, with low consumption of energy and great compactness.

The computer or computers CALC comprise hardware-incorporating means suitable for integrating sensors and effectors, and software-incorporating means, for example in the computer CALC, suitable for integrating software elements. Thus the system is particularly modifiable and adaptable.

The articulation ART can be furnished with an electric motor MEC controlled by means for managing the stability of the platform PFM, which are integrated into the computer CALC and furnished with means for measuring the inclination of the running surface, such as an inclinometer.

The articulation ART can be achieved in the form of a longitudinal pivot, when referring to the mobile platform PFM, which is an articulation with one degree of freedom, which is particularly useful in the mechanical linkage assembly ELM, notably for negotiating one or more stairs.

The computer assembly CALC comprises a management module GES for managing integrated sensorimotor behaviors CS, suitable for arbitrating implementations of several sensorimotor behaviors CS in parallel.

The computer CALC comprises software means suitable for integrating new equipment and new functionalities pertaining, notably, at one and the same time to the displacement capability and to the utilization of the diverse onboard elements, such as sensors or effectors.

Concerning the displacement, it can be manual, the user being transported on the robotized vehicle, or else radiocontrolled, or else autonomous supervised by the user.

The autonomous displacement is based on an assembly of sensorimotor behaviors CS allowing the platform to move while taking account of the near environment. Each sensorimotor behavior CS is achieved by implementing one or more sensors providing information representative of the environment (mono-vision or stereovision cameras under visible or infrared light, two-dimensional laser sheet, three-dimensional laser imager, millimetric radar, etc.), and dedicated software utilizing the data delivered by these sensors to control the motorization of the vehicle in order to slave its displacement accordingly.

The sensorimotor behaviors CS, known to the person skilled in the art, that are integrated or available can comprise, for example, the following:

- automatic following of a person, the latter possibly being notably the user of the robotized system,
- automatic following of a road edge or path edge,
- automatic following of a vehicle,
- automatic following of a "vertical reference" (wall, boundary, fence, etc.)
- automatic homing in on a point designated by its geographical coordinates, for example expressed in latitude and longitude, and
- automatic homing in on an object indicated remotely by the user on a video image perceived by a camera onboard the robotized system.

The global displacement between a departure point and an arrival point is achieved by chaining together sensorimotor behaviors CS and/or phases of radiocontrol of the robotized system.

The chaining can be imposed by the user in a mission preparation phase or decided in real time by the management module GES, comprising for example onboard software means called the mission controller. In both cases, the choice of the relevant or appropriate sensorimotor behaviors CS relies on some a priori knowledge of the environment (presence of a road or boundary that can be followed, of an object to be homed in on, etc.), said knowledge being of cartographic origin or else accumulated during previous missions.

Each sensorimotor behavior CS can be implemented by means of one or more complementary algorithms so as to improve its robustness and its operating domain. Accordingly, the basic algorithms can be supplemented with a specific auto-evaluation mechanism, providing in real time a confidence index regarding its capability to correctly accomplish the function.

A multi-algorithm arbitration mechanism can utilize, in real time, this confidence index, as well as the formalization of a priori knowledge of the performance of the algorithm, so as to entrust the execution of the sensorimotor behavior CS to the algorithm judged the most effective at the current instant, as a function of the present situation. The switch from one algorithm to another is done on the fly, during the displacement, via mechanisms which ensure the continuity of the displacement.

If none of the algorithms available for one and the same sensorimotor behavior CS is recognized as capable of ensuring the displacement, then there is failure of the achieving of the corresponding sensorimotor behavior CS.

In case of failure of the sensorimotor behavior CS, if the sensorimotor behavior CS was imposed by the user, the latter is informed thereof and resumes control of the system (by imposing another sensorimotor behavior CS or by radiocontrol). If the sensorimotor behavior CS originated from a selection by the management module (mission controller), the latter evaluates the possibility of activating another sensorimotor behavior CS by relying on an assembly of deterministic or probabilistic evaluation criteria. If no possibility of sensorimotor behavior CS is substantiated, then the user is prompted to resume control.

These various functionalities lead to defining the concept of Adjustable Autonomy, in which Man and the System apportion the tasks to be accomplished as per their capabilities and, for Man, his wishes.

Concerning the utilization of the onboard payloads, or, stated otherwise, of the various onboard elements aboard the robotized system, the following is noted.

The collaborative robotized system is equipped to receive and transport diverse payloads, that may be passive (bags, packages, etc.) or active (that is to say powered to render a functional service such as an observation, a detection, a manipulation, or a destruction, etc.).

The collaborative robotized system has an assembly of standardized mechanical, electrical and digital interfaces, making it possible to connect, to power and to utilize an extensive assembly of active payloads.

The system can implement, automatically or by radiocontrol, the onboard active payloads. In the case of use by radiocontrol, the operator's MMI makes it possible to remotely control all the functionalities of the active payload.

Furthermore, the collaborative robotized system can comprise a millimetric radar, a laser telemeter, and a fusion module for merging the data delivered by said radar and said telemeter.

The remote control elements can comprise a wireless communication tactile element CD, and/or a head-up sight, and/or a control handle. The remote control elements can also comprise a force-feedback element, making it possible to correctly control remotely an optional element gripping device.

Furthermore, the platform PFM can be furnished with a module for transmitting information representative of the exterior environment of the platform PFM, comprising for example a video camera, and said wireless communication tactile element CD can comprise a module for viewing, on the screen of the tactile element CD, of the exterior environment of the platform PFM. A module for selecting an element to be reached by the mobile platform PFM on the basis of the module for viewing the exterior environment of the platform.

The system is of reduced bulk, of width less than 70 cm and of mass less than 50 kg.

The mobile platform is suitable for transporting a human being.

Figure 2:
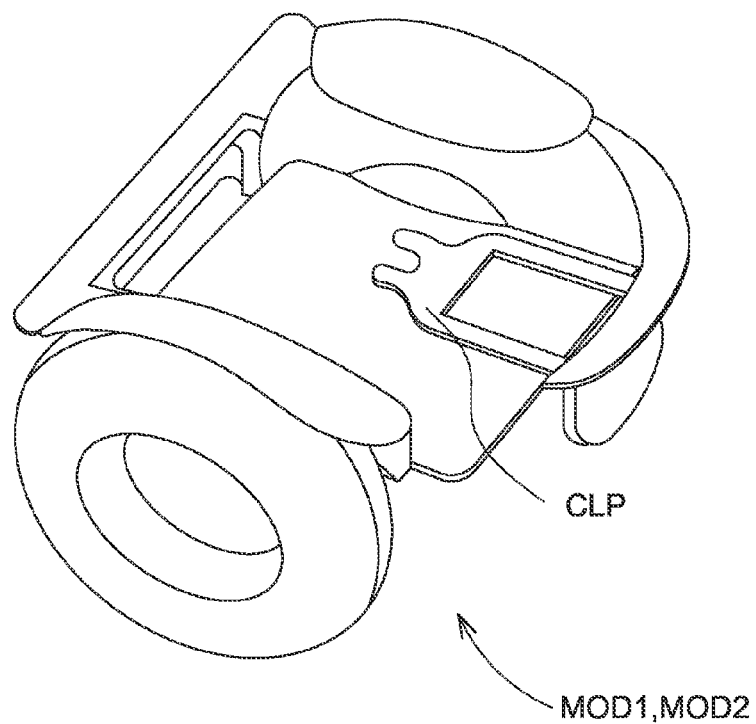
FIGS. 2 and 3 schematically illustrate an embodiment of the mobile platform of the collaborative robotized system, according to one aspect of the invention.
Figure 3:
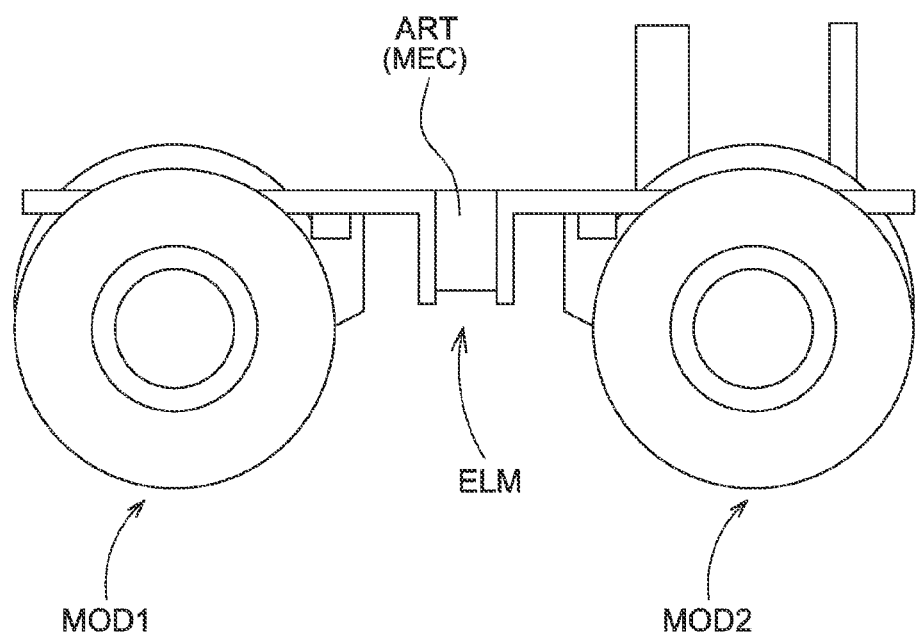

Furthermore, as illustrated in FIGS. 2 and 3, the mechanical linkage assembly ELM is dismantlable, this being particularly practical for terrestrial logistical transport and in the case where the system is airdropped in several parts.

For example, the system can be mounted using clips CLP, in less than three minutes, making it possible to link, with the mechanical linkage assembly ELM, two elements or modules MOD1 and MOD2 of the platform each comprising an axle and two wheels.

The present invention proposes an adaptable, modifiable, collaborative robotized system of reduced bulk, that is also able to transport its user.

The invention claimed is:

1. A collaborative robotized system comprising:
   a mobile platform (PFM) furnished with running means, with an electric motor propulsion assembly (ME1, ME2, ME3, ME4), and with a longitudinal mechanical linkage assembly (ELM) comprising an articulation (ART);
   an electrical power source;
   manual means of control (CM) of the system;
   means of remote control (CD) of the system;
   a computer assembly of at least one computer (CALC);
   hardware-incorporating means suitable for integrating sensors and effectors, and software-incorporating means (CALC) suitable for integrating software elements; and management means (GES) for managing integrated sensorimotor behaviors (CS), suitable for arbitrating implementations of several sensorimotor behaviors (CS) in parallel on the basis of a priori knowledge about the performance of said sensorimotor behaviors (CS) as a function of the environment of the mobile platform (PFM), and suitable for operating with adjustable autonomy varying from complete autonomy to teleoperation, via partial autonomy of collaboration with a teleoperator, for the various sensorimotor behaviors (CS).

2. The system as claimed in claim 1, wherein said computer assembly (CALC) has parallel processors comprising elementary processors able simultaneously to execute one and the same instruction on different data belonging to a data structure.

3. The system as claimed in claim 1, wherein said articulation (ART) is furnished with an electric motor controlled by means for managing the stability of the platform which are furnished with means for measuring the inclination of the running surface.

4. The system as claimed in claim 1, wherein the articulation (ART) is a pivot.

5. The system as claimed in claim 1, further comprising a millimetric radar, a laser telemeter, and fusion means for merging the data delivered by said radar and said telemeter.

6. The system as claimed in claim 1, wherein said remote control means comprise a wireless communication tactile element (CD), and/or a head-up sight, and/or a control handle.

7. The system as claimed in claim 1, wherein said remote control means (CD) comprise a force-feedback element.

8. The system as claimed in claim 1, wherein said platform (PFM) is furnished with means for transmitting information representative of the exterior environment of the platform, and said remote control means (CD) comprise means for viewing the exterior environment of the platform (PFM).

9. The system as claimed in claim 8, further comprising means for selecting an element to be reached by the mobile platform (PFM) on the basis of said means for viewing the exterior environment of the platform.

10. The system as claimed in claim 1, of reduced bulk, of width less than 70 cm and of mass less than 100 kg.

11. The system as claimed in claim 1, wherein said mobile platform (PFM) is suitable for transporting a human being.

12. The system as claimed in claim 1, wherein said mechanical linkage assembly (ELM) is dismantlable.

13. The system as claimed in claim 1, in which said management means (GES) for managing integrated sensorimotor behaviors (CS), are adapted to arbitrate implementations of several sensorimotor behaviors (CS) in parallel, furthermore on the basis of a priori knowledge of performance of the algorithm implemented by a sensorimotor behavior (CS), and of a confidence index regarding the ability of the algorithm to correctly accomplish the sensorimotor behavior (CS).

* * * * *